Patented Sept. 7, 1926.

1,599,363

UNITED STATES PATENT OFFICE.

JOSEF JANNEK, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

RECOVERING SULPHUR.

No Drawing. Application filed December 21, 1925, Serial No. 76,893, and in Germany December 22, 1924.

I have found that masses containing sulphur, especially active charcoal loaded with sulphur by the catalytic oxidation of sulphuretted hydrogen, can be conveniently and completely desulphurized and regenerated for fresh use while at the same time elementary sulphur is obtained, by passing superheated steam through the mass with an extraordinarily high speed of for example 1 metre per second (calculated on the empty container) or even much more, preferably in a downward direction. As soon as the whole mass is heated by the steam, which is rapidly done on account of its high speed, the sulphur flows out of the container in the liquid state. The steam leaving the apparatus is either introduced into cold water and condensed, or still better, only washed with water, in which case care must be taken by adding fresh water to make up for the loss of water by vaporization. Or, the molten sulphur leaving the apparatus is separated in a special receiver and the steam subsequently condensed or washed whereby the sulphur carried along with it as a vapor or mist is recovered. In order to save steam, it is advantageous to use the steam over again in a circular course, superheating it after removing the sulphur and passing it again through the mass to be desulphurized by means of a circulating pump.

The masses treated in this manner are ready for new use, at once or after being cooled for example by a current of purified gas without having lost in efficiency. Inert gases may be mixed with the steam.

The following example will further illustrate my invention which, however, is not limited to this example.

Example.

Steam superheated to about 220 degrees to 250 degrees centigrade is passed with a speed of 250 centimetres per second, calculated on the empty container in a downward direction through a layer of 60 centimetres of granular active charcoal loaded with sulphur by the catalytic oxidation of sulphuretted hydrogen contained in water gas with the aid of a restricted quantity of air in the manner known per se. By the steam, the charcoal is heated in some minutes; the sulphur is expelled from the pores of the charcoal in the liquid state and drawn downwards. When the lowest part of the charcoal layer has reached a temperature of 160 degrees to 200 degrees centigrade, the sulphur flows out of the charcoal container and is collected in a separator from which it may be poured into moulds when the regeneration of the charcoal is over or while it still lasts. The steam is passed through a washer with an automatically controlled water level, for example with a float-valve, and when led back to the charcoal container through the superheater by means of a circulating pump, the addition of fresh steam being now stopped.

When maintaining in the washer a pressure of about 0.7 atmospheres and accordingly a temperature of about 115 degrees centigrade, the sulphur is collected therein in a liquid state and can be readily withdrawn.

I claim:

1. The process of recovering sulphur from masses containing sulphur which consists in passing superheated steam with extremely high speed through the mass and separating the sulphur from the steam.

2. The process of recovering sulphur from masses containing sulphur which consists in passing superheated steam through the mass in a downward direction with a speed of at least 1 metre per second calculated on the empty room for the mass and separating the sulphur from the steam.

3. The process of recovering sulphur from masses containing sulphur which consists in passing superheated steam through the mass in a downward direction with a speed of at least 1 metre per second calculated on the empty room for the mass, removing the sulphur by washing the steam with water and using the steam again in a circular course.

4. The process of recovering sulphur from masses containing sulphur which consists in passing superheated steam through the mass in a downward direction with a speed of at least 1 metre per second calculated on the empty room for the mass, separating the bulk of the sulphur in the liquid state, removing the rest of it by washing the steam with water and using the steam again in a circular course.

In testimony whereof I have hereunto set my hand.

JOSEF JANNEK.